United States Patent
Kim

(10) Patent No.: US 12,549,655 B2
(45) Date of Patent: Feb. 10, 2026

(54) PORTABLE DEVICE MOUNT

(71) Applicant: SAMSUNG ELECTRONICS CO., LTD., Suwon-si (KR)

(72) Inventor: Jiseon Kim, Suwon-si (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 614 days.

(21) Appl. No.: 17/962,949

(22) Filed: Oct. 10, 2022

(65) Prior Publication Data

US 2023/0033640 A1    Feb. 2, 2023

Related U.S. Application Data

(63) Continuation of application No. PCT/KR2021/004509, filed on Apr. 9, 2021.

(30) Foreign Application Priority Data

Apr. 10, 2020    (KR) .................. 10-2020-0044097

(51) Int. Cl.
*H04M 1/06*    (2006.01)
*H02J 7/00*    (2006.01)
(Continued)

(52) U.S. Cl.
CPC .............. *H04M 1/04* (2013.01); *H02J 7/0044* (2013.01); *H02J 50/005* (2020.01); *H02J 50/10* (2016.02); *H02J 50/90* (2016.02)

(58) Field of Classification Search
CPC ........ H02J 7/0044; H02J 50/005; H02J 50/10; H02J 50/90; H04M 1/04
See application file for complete search history.

(56) References Cited

U.S. PATENT DOCUMENTS

| | | | |
|---|---|---|---|
| 11,412,149 B1* | 8/2022 | Gandhi | ................. H04N 23/695 |
| 2004/0209655 A1* | 10/2004 | Kubo | .................. H04B 1/3877 |
| | | | 455/575.1 |

(Continued)

FOREIGN PATENT DOCUMENTS

| | | |
|---|---|---|
| CN | 102463935 B | 1/2014 |
| JP | 2018057624 A | 4/2018 |

(Continued)

OTHER PUBLICATIONS

Korean Office Action Issued in KR Patent Application No. 10-2020-0044097, Issue Date Mar. 4, 2024, 8 Pages.

(Continued)

*Primary Examiner* — Dai Phuong
(74) *Attorney, Agent, or Firm* — CANTOR COLBURN LLP

(57) ABSTRACT

A holder for an external electronic device is provided. The holder includes a body, a cradle rotatably coupled to the body and including a seating surface on which the external electronic device is seatable, a first driving unit configured to rotate the cradle, a wireless communication circuit and at least one processor. The at least one processor is configured to: receive data about the status of the external electronic device from the external electronic device through the wireless communication circuit and to control the first driving unit on the basis of the status of external electronic device such that the cradle is pivoted by a predetermined angle. A housing of the external electronic device can be foldable.

20 Claims, 12 Drawing Sheets

(51) Int. Cl.
  *H02J 50/00* (2016.01)
  *H02J 50/10* (2016.01)
  *H02J 50/90* (2016.01)
  *H04M 1/04* (2006.01)

(56) References Cited

U.S. PATENT DOCUMENTS

| | | | |
|---|---|---|---|
| 2008/0061205 A1* | 3/2008 | Park | H04M 1/04 |
| | | | 248/291.1 |
| 2011/0053660 A1* | 3/2011 | Park | B60R 11/0241 |
| | | | 455/575.1 |
| 2011/0074344 A1 | 3/2011 | Park et al. | |
| 2017/0110902 A1 | 4/2017 | Miller et al. | |
| 2018/0106418 A1* | 4/2018 | Anglin | H04N 23/695 |
| 2019/0223329 A1 | 7/2019 | Moon et al. | |
| 2021/0178977 A1* | 6/2021 | Gianakopoulos | |
| | | | B64D 11/00152 |
| 2021/0356847 A1* | 11/2021 | Li | G03B 17/561 |

FOREIGN PATENT DOCUMENTS

| | | |
|---|---|---|
| KR | 20110034773 A | 4/2011 |
| KR | 1332388 B1 | 11/2013 |
| KR | 101426915 B1 | 8/2014 |
| KR | 101554729 B1 | 9/2015 |
| KR | 101797486 B1 | 11/2017 |
| KR | 20180017631 A | 2/2018 |
| KR | 102062285 B1 | 1/2020 |
| KR | 20200044288 A | 4/2020 |

OTHER PUBLICATIONS

Notice of Patent Grant mailed Nov. 22, 2024 in KR Application No. 10-2020-0044097, 3 pages.
International Search Report and Written Opinion for International Application No. PCT/KR2021/004509; International Filing Date Apr. 9, 2021; Date of Mailing Jul. 26, 2021; 41 Pages.

* cited by examiner

PORTABLE DEVICE MOUNT

CROSS-REFERENCE TO RELATED APPLICATION(S)

This application is a continuation of International Application No. PCT/KR2021/004509 designating the United States, filed on Apr. 9, 2021, in the Korean Intellectual Property Receiving Office and claiming priority to Korean Patent Application No. 10-2020-0044097, filed on Apr. 10, 2020, in the Korean Intellectual Property Office, the disclosures of which are incorporated by reference herein in their entireties.

BACKGROUND

Field

The present disclosure relates to a device on which a portable device may be held. More specifically, it relates to a holder on which a foldable device may be held.

Description of Related Art

Since interaction between a user and a device (i.e., a tablet or a smart phone) is generally made through touch, the user uses and grips the device at the same time. However, in the case of a service not requiring frequent interaction between the user and the device while the user is using a service through the device, it is convenient to have the device held on a holder. This way, the user can freely use both hands while still using various services through the device. For example, when a smart phone is held on a holder installed inside a vehicle, a driver can use a navigation service through the smart phone while handling a steering wheel of the vehicle with both hands.

On the other hand, recent versions of smart phones typically employ a large display to provide a lot of information on a screen or to provide a comfortable video viewing experience. This large display can reduce the portability of the smart phone. Accordingly, smart phones have also recently been made to be foldable with flexible displays. These flexible displays can be folded or unfolded, while providing a wide screen and relatively excellent portability.

SUMMARY

Since a foldable device has various shapes in its unfolded or folded states, a conventional holder is not suitable for use in holding the foldable device. For example, when a foldable device is unfolded, a width of the foldable device can be almost doubled as compared to when it is folded. Thus, it can be difficult to hold a foldable device on a general holder that is not compatible with the folding and unfolding.

In particular, when the holder supports wireless charging, the wireless charging may not be normally performed depending on a folded state of a foldable device. For example, a charging coil inside the foldable device can be positioned at a center of the foldable device when the device is folded, and be positioned out of the center when the foldable device is unfolded. When a coil of the holder is fixed in position, the wireless charging may not be normally performed depending on the state of the foldable device.

An object of the present disclosure is to provide an apparatus capable of properly holding a foldable device. Also, an object of the present disclosure is to provide a holder capable of wirelessly charging the foldable device regardless of a state of the foldable device.

Technical problems to be achieved in the present disclosure are not limited to the technical problems mentioned above, and other technical problems not mentioned can be clearly understood by those of ordinary skill in the art to which the present disclosure belongs from the description below.

In an embodiment of the present disclosure, a holder may include a body, a cradle rotatably coupled to the body and including a seating surface on which an external electronic device is seatable, a first driving unit configured to rotate the cradle, a wireless communication circuit, and at least one processor. The at least one processor may be configured to receive data about a state of the external electronic device from the external electronic device through the wireless communication circuit, and to control the first driving unit to pivot the cradle by a predetermined angle based on the state of the external electronic device.

A holder for a foldable device of various embodiments of the present disclosure may include a body, a cradle rotatably coupled to the body and including a seating surface on which the foldable device is seatable, and arms assembled to the body and movable in opposite directions relative to the body through a first mechanism, each of the arms including a grip configured to hold the foldable device, and an interval between the grips being variable within a predetermined range according to the movement of the arms. The cradle may be configured to maintain a stationary state relative to the body when the interval between the grips is in a first range among the predetermined range, and rotate relative to the body through a second mechanism when the interval between the grips is in a second range among the predetermined range.

According to various embodiments of the present disclosure, a holder may firmly fix a foldable device regardless of a state of the foldable device. The holder may include components whose positions or directions are varied in response to the state of the foldable device when the foldable device is unfolded or folded. Also, according to various embodiments of the present disclosure, the holder may wirelessly charge the foldable device regardless of the state of the foldable device.

Effects obtainable in the present disclosure are not limited to the above-mentioned effects, and other effects not mentioned may be clearly understood by those of ordinary skill in the art to which the present disclosure belongs from the description below.

DETAILED DESCRIPTION

The present disclosure relates to a holder 100 that may hold an external device (e.g., a smart phone and a tablet). In the present disclosure, the external device means a device that may be seated on the holder 100.

Figure 1:
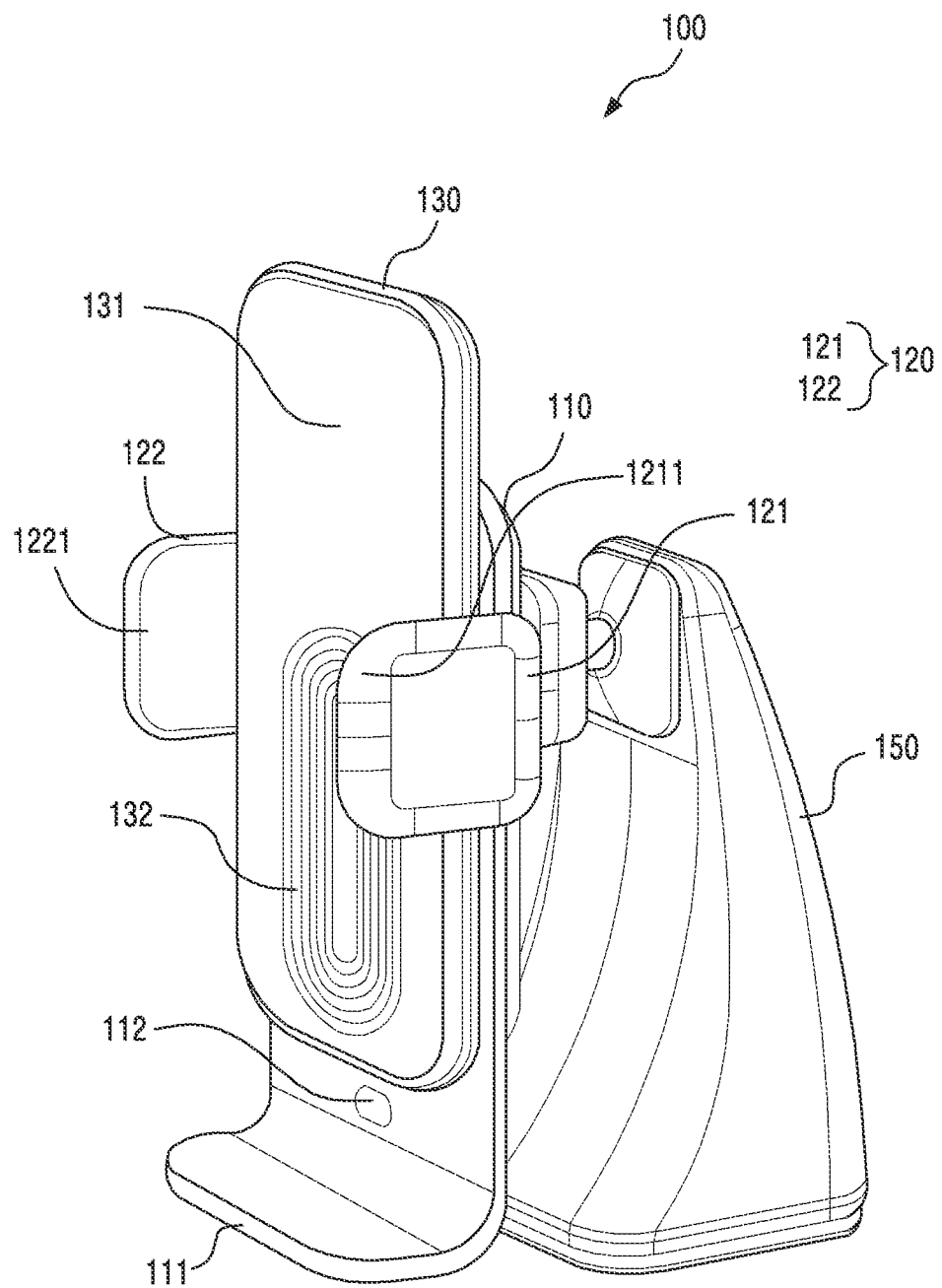
FIG. 1 illustrates a holder including a pair of arms in an embodiment.
Figure 2:
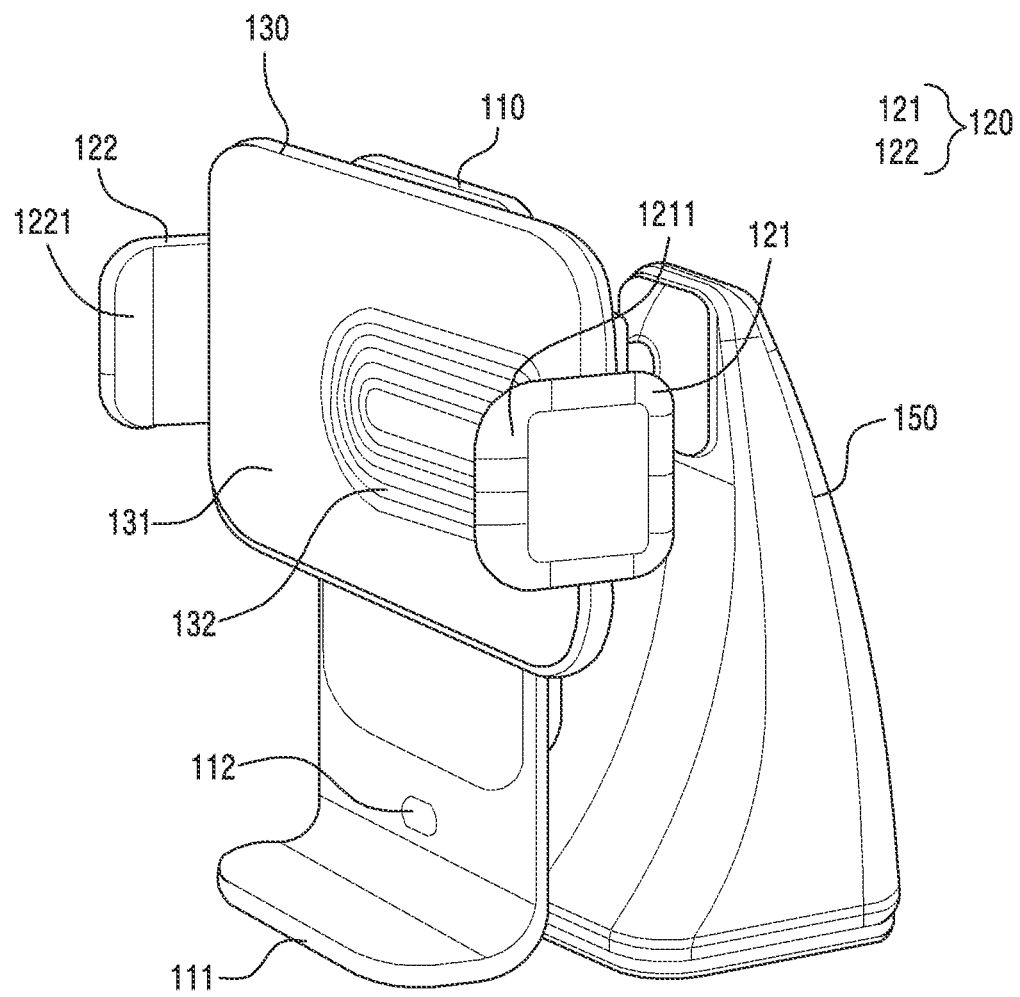
FIG. 2 illustrates a holder of a state in which a grip interval is increased in an embodiment.
Figure 3:
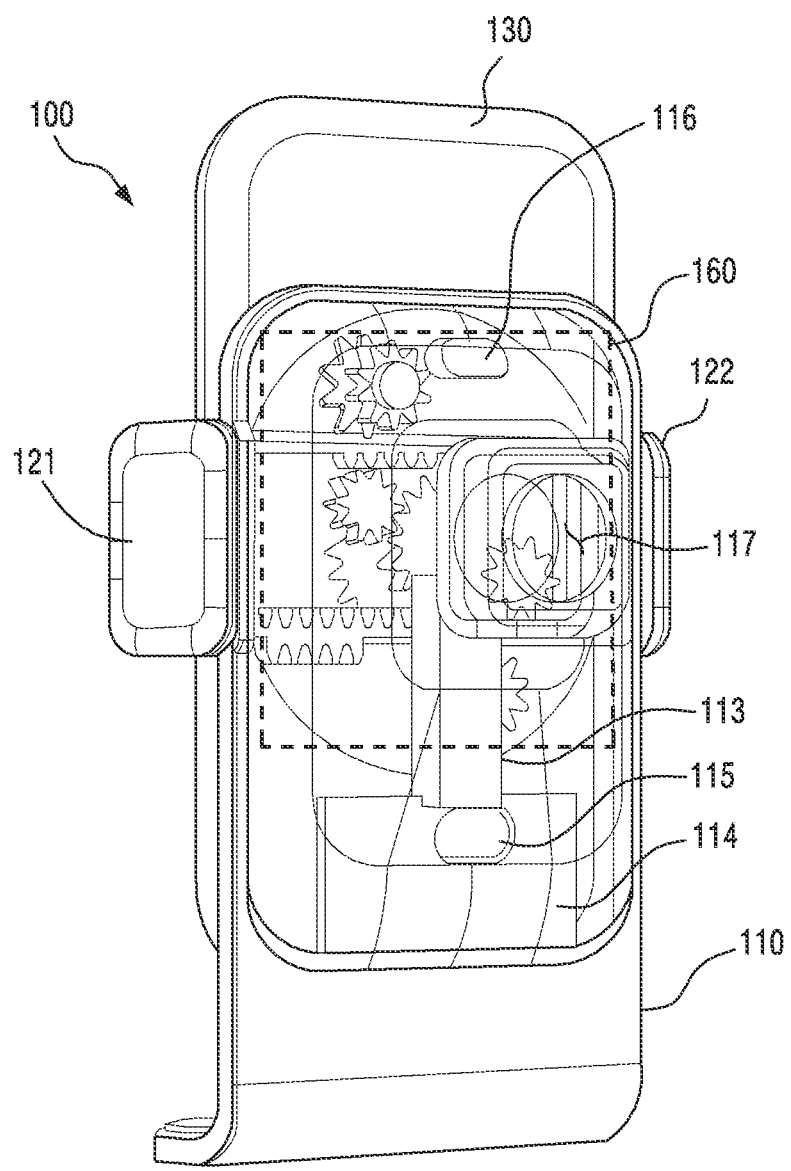
FIG. 3 illustrates components disposed inside a holder in an embodiment.
Figure 4:
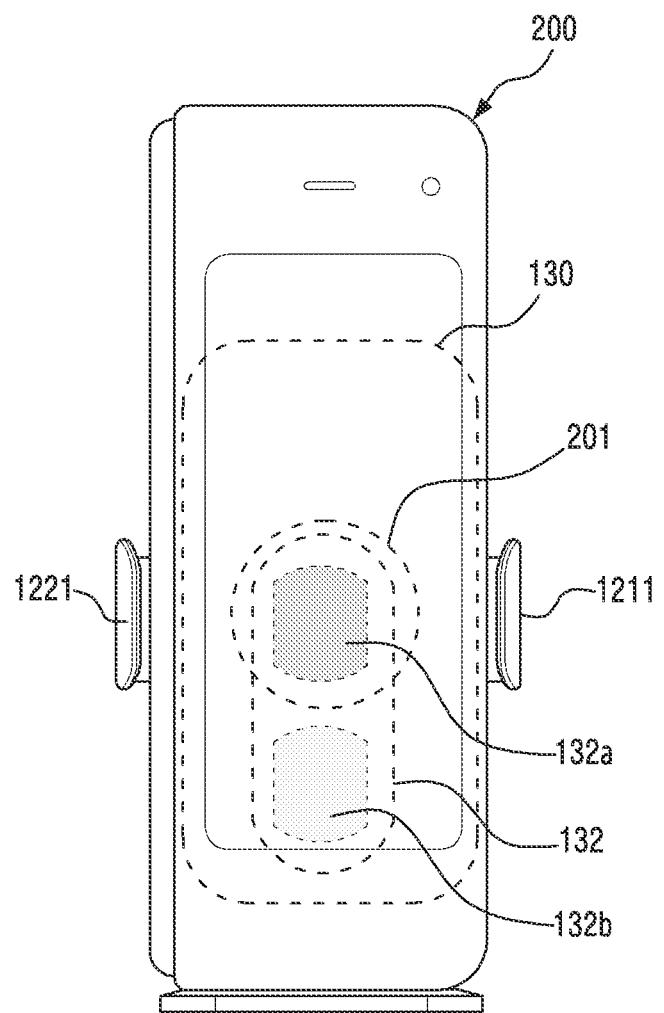
FIG. 4 illustrates a holder for holding a foldable device in a folded state in an embodiment.
Figure 5:
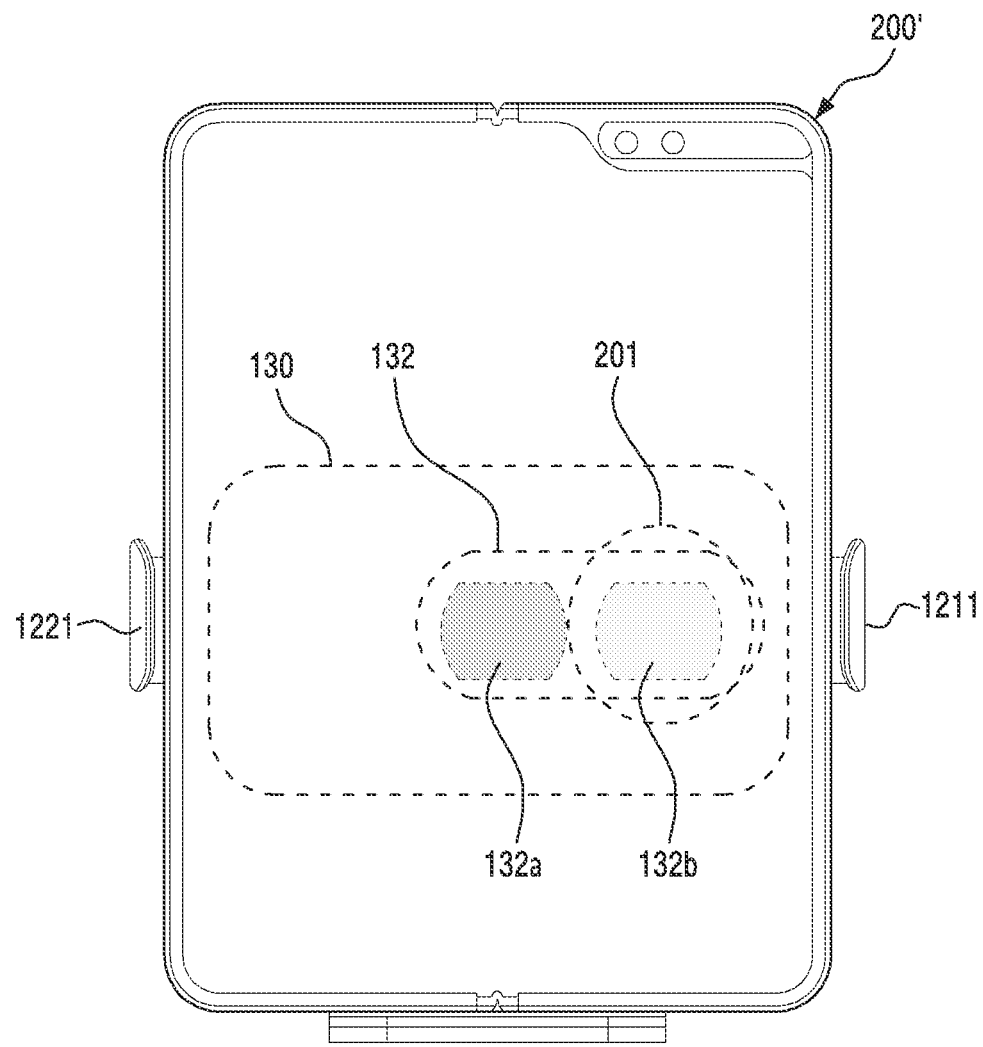
FIG. 5 illustrates a holder for holding a foldable device in an unfolded state in an embodiment.

FIG. 1 illustrates a holder 100 including a pair of arms 120 in an embodiment. FIG. 2 illustrates the holder 100 of a state in which a grip interval is increased in an embodiment. FIG. 3 illustrates components disposed inside the holder 100 in an embodiment. FIG. 4 illustrates the holder 100 for holding a foldable device of a folded state in an embodiment. FIG. 5 illustrates the holder 100 for holding a foldable device of an unfolded state in an embodiment.

Referring to FIG. 1 to FIG. 3, the holder 100 includes a body 110. In an embodiment, the body 110 may include a mechanism related to the operation of the holder 100 therein. In an embodiment, the body 110 may be configured to be coupled to a stand 150 or mount for fixing the holder 100 to another structure (e.g., a vehicle and a table). For example, the body 110 may include a socket that may accommodate a portion of the stand 150.

In an embodiment, the body 110 may include a support part 111 extending in front of the holder 100. When a rear surface of the external device is seated on the holder 100, one edge of the external device may be placed on the support part 111, and the support part 111 may be configured to bear a weight of the external device.

In an embodiment, the holder 100 may include a cradle 130 disposed on the body 110. The external device may be seated on the cradle 130. For example, when the external device is seated on the holder 100, a rear surface of the external device may contact a seating surface 131 of the cradle 130. In an embodiment, the cradle 130 may be assembled to the body 110 to be able to rotate or pivot relative to the body 110. Accordingly, in an embodiment, the cradle 130 may be in various orientations relative to the body 110. For example, the cradle may be in a landscape orientation or portrait orientation relative to the body when an aspect ratio of the cradle is greater than 1. The cradle 130 disposed in the portrait orientation on the body 110 as shown in FIG. 1 may be rotated relative to the body 110 and be disposed in the landscape orientation relative to the body 110 as shown in FIG. 2.

Referring to FIG. 1, the holder 100 may include the pair of arms 120 assembled to the body 110. In an embodiment, the pair of arms 120 may hold a side edge of the external device and fix the external device to the holder 100. In an embodiment, each of the arms 121 and 122 may include grip parts 1211 and 1221. The arms 121 and 122 or the grip parts 1211 and 1221 may be configured to fix the external device to the holder 100. For example, the first arm 121 and the second arm 122 may respectively include the first grip part 1211 and the second grip part 1221. When the external device is seated on the holder 100, the external device may be positioned between the first grip part 1211 and the second grip part 1221. When an interval (hereinafter, a grip interval) between the grip parts 1211 and 1221 is narrowed to correspond to a width of the external device, the external device may be fixed to the holder 100.

In an embodiment, the pair of arms 120 may be configured to adjust the grip interval. For example, the first arm 121 and the second arm 122 may be assembled to the body 110 to move in opposite directions. For example, when the first arm 121 moves in a first direction, the second arm 122 may move in a second direction opposite to the first direction. As the arms 121 and 122 move relative to the body 110, the grip interval may be widened or narrowed.

In an embodiment, the grip interval may be changed within a predetermined range, and the cradle 130 may rotate while the grip interval is changed in at least a partial section of the predetermined range. In an embodiment, while the grip interval is changed in a first range, the cradle 130 may maintain a stationary state relative to the body 110 without rotating. In an embodiment, the cradle 130 may rotate while the grip interval is changed in a second range that is distinguished from the first range.

In an embodiment, while the grip interval is increased in a specific range, the cradle 130 may rotate by a predetermined angle in a first direction (e.g., a clockwise direction) relative to the body 110. While the grip interval is decreased in the specific range, the cradle 130 may rotate by a predetermined angle in a direction (e.g., a counterclockwise direction) opposite to the first direction relative to the body 110. The rotation of the cradle 130 dependent on the grip interval will be described in detail with reference to FIG. 9.

In an embodiment, the cradle 130 may include a wireless charging coil 132. The wireless charging coil 132 may be disposed inside the cradle 130 to be aligned with a wireless charging coil of the external device. When the external device is seated on the holder 100, and the coil 132 of the cradle 130 is aligned with the coil of the external device, the holder 100 may wirelessly transmit power to the external device.

In an embodiment, the wireless charging coil 132 may have various shapes. For example, the wireless charging coil 132 may have a circular shape. In an embodiment, the wireless charging coil 132 may be formed of a combination of a plurality of wireless charging coils. For example, the wireless charging coil may include a first wireless charging coil and a second wireless charging coil electrically connected to the first wireless charging coil. For example, the first wireless charging coil may be spaced apart from the second wireless charging coil in a longitudinal direction of the cradle 130. For example, the first wireless charging coil and the second wireless charging coil may have an overall shape of the letter 8.

In an embodiment, the wireless charging coil 132 may be disposed in a partial region of the cradle 130. For example, in an embodiment, the wireless charging coil 132 may be eccentrically disposed from the center of the cradle 130 to one side of the cradle 130 as shown in the embodiment shown in FIG. 1.

In an embodiment, the wireless charging coil 132 may have a shape such that the wireless charging coil 132 extends in one direction of the cradle 130. For example, when the cradle 130 has a shape in which a length is longer than a breadth as in the embodiment shown in FIG. 1, the wireless charging coil 132 may be elongate in a vertical direction of the cradle 130. For example, the wireless charging coil 132 may have a stadium shape or a round rectangle or a slot shape.

On the other hand, although the wireless charging coil 132 is shown as being exposed to the outside in FIG. 1 and FIG. 2, this is for description convenience's sake. The wireless charging coil 132 is generally disposed inside the cradle 130 and is not visible to the outside.

Meanwhile, a foldable device as the external device that may be seated on the holder 100 may include a first housing and a second housing that may rotate relative to each other. When the foldable device supports wireless charging, a wireless charging coil may be disposed inside one of the first housing or the second housing. For example, if the wireless charging coil is disposed at the center of the first housing, the wireless charging coil is positioned at the center of the foldable device when the foldable device is in a folded state. On the other hand, when the foldable device is unfolded, the wireless charging coil is positioned out of the center of the foldable device. When a position of the wireless charging coil of the holder 100 is not changed according to a change of a state of the foldable device, the two coils may not be properly aligned with each other even when the foldable device of the unfolded state is seated on the holder 100. As a result, power transmission may not occur or charging efficiency may be reduced.

In an embodiment, since the cradle 130 may rotate relative to the body 110, the wireless charging coil 132 disposed inside the cradle 130 may be disposed in a different position depending on a state of the external foldable device. In an embodiment, when the cradle 130 is vertically disposed on the body 110, the wireless charging coil 132 of the cradle 130 may be aligned with the wireless charging coil 201 of the foldable device 200 in the folded state. In an embodiment, when the cradle 130 is horizontally disposed on the body 110, the wireless charging coil 132 of the cradle 130 may be aligned with the wireless charging coil 201 of the foldable device 200' in the unfolded state.

In an embodiment, the coil 132 of the cradle 130 may be aligned with the coil 201 of the foldable device 200 irrespective of a change of a state of the foldable device 200. Referring to FIG. 4, the foldable device 200 of the folded state may be seated on the cradle 130 in a portrait orientation. A first portion 132a of the coil 132 of the cradle 130 may be aligned with the coil 201 of the foldable device 200 in the folded state. When the foldable device 200 is in the unfolded state, the holder 100 may recognize the state of the foldable device 200 and pivot the cradle 130 from the portrait orientation to a landscape orientation. Referring to FIG. 5, the foldable device 200' of the unfolded state may be seated on the cradle 130 in the landscape orientation. A second portion 132b of the coil 132 of the cradle 130 may be aligned with the coil 201 of the foldable device 200' of the unfolded state.

In an embodiment, the holder 100 may include at least one sensor 112. In an embodiment, the at least one sensor 112 may be installed on the body 110. In an embodiment, the at least one sensor 112 may include a proximity sensor capable of measuring whether the external device is located close to the holder 100. For example, an infrared sensor may be installed on the body 110. Light emitting/light receiving elements of the infrared sensor may face a front surface of the holder 100. In an embodiment, the holder 100 may determine whether the external device approaches or whether the external device is seated on the holder 100 through the proximity sensor. In an embodiment, when the external device approaches the holder 100, the holder 100 may widen a grip interval by using the proximity sensor such that the external device may be easily held on the holder 100.

Figure 9:
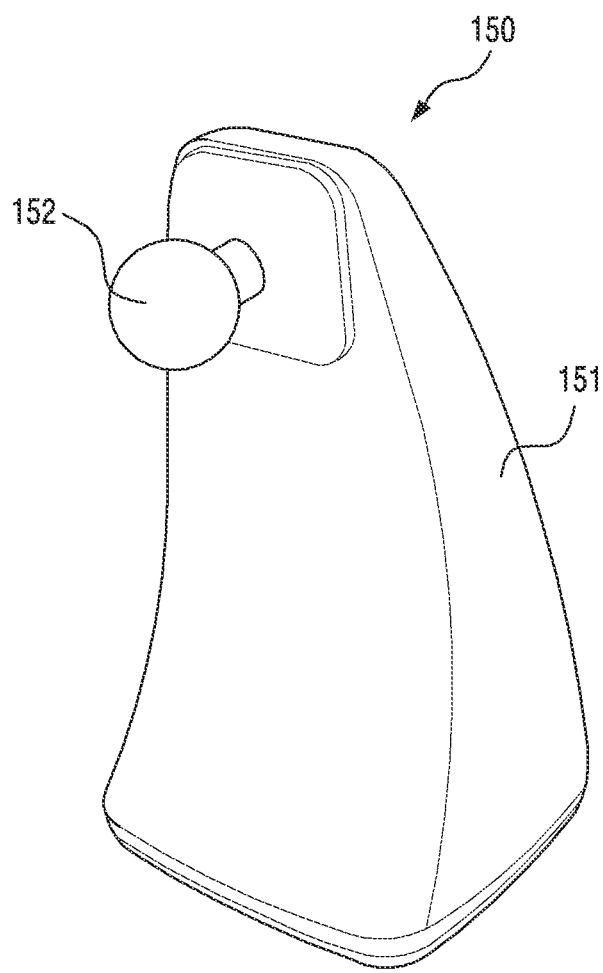
FIG. 9 illustrates a stand to support the holder of FIG. 1 in an embodiment.

In an embodiment, the body 110 may include a socket 117 that may accommodate a ball part of a stand (e.g., a stand 150 of FIG. 9). When the ball part is accommodated in the socket 117, the body 110 may rotate relative to the stand in a predetermined range.

In an embodiment, the holder 100 may include a mechanism capable of adjusting a grip interval. A detail of the mechanism for adjusting the grip interval is described with reference to FIG. 6 and FIG. 7. In an embodiment, the mechanism for adjusting the grip interval may be operated by a driving unit (e.g., a motor 113, see FIG. 3). For example, the motor 113 may include a linear motor, a servo motor, or a step motor.

In an embodiment, the holder 100 may include a printed circuit board 114. The printed circuit board 114 may include at least one processor (e.g., a wireless communication circuit, a power management circuit). In an embodiment, the at least one processor may control the operations of the at least one sensor 112 and the motor 113 and manage the power of the holder 100. In the present disclosure, the operation of the holder 100 may be understood to be performed by the at least one processor.

In an embodiment, the holder 100 may include a wireless communication circuit. In an embodiment, the holder 100 may receive data about a state of an external device from the external device through the wireless communication circuit. For example, the holder 100 may receive a signal regarding the state of the external device through Bluetooth™ communication or near field communication. The holder 100 may control the motor 113 based on the data received from the external device. Accordingly, an interval between grips may be adjusted suitably to the state of the external device. For example, when the external device is a foldable device, the holder 100 may determine whether the foldable device is in a folded state or an unfolded state through communication with the external device. When the external device is in the folded state, the holder 100 may adjust the grip interval to be narrow through the motor 113. When the external device is in the unfolded state, the holder 100 may widely adjust the grip interval through the motor 113.

In an embodiment, the wireless communication circuit may support Bluetooth™ communication. When the Bluetooth™ communication is established between the holder 100 and the external device, data may be transmitted and/or received in both directions. Additionally or alternatively, in other embodiments, the wireless communication circuit may support near field communication (NFC). In this case, the wireless charging circuit may include an RFID reader. The holder 100 may receive data from the external device by using the RFID reader.

In an embodiment, the holder 100 may include a wireless charging circuit. The wireless charging circuit may be electrically connected to the wireless charging coil 132 of the holder 100, and may wirelessly transmit power to an external electronic device.

In an embodiment, the holder 100 may determine whether wireless charging is normally performed between the external electronic device and the holder 100 through the wireless communication circuit. In an embodiment, the holder 100 may acquire data related to efficiency of power transmission through the wireless communication circuit (e.g., Bluetooth™). When the efficiency of wireless power transmission is lower than a threshold value, the holder may identify that the wireless charging is not in a normal condition. The holder may determine whether a wireless charging coil of the holder is aligned with a wireless charging coil of the external device based on the efficiency of the wireless charging.

In an embodiment, the holder 100 may include a port 115 for supplying power. An external power supply may supply power to the holder 100 through the port 115. For example, the port 115 may be electrically connected to a wireless charging circuit or a power management circuit of the printed circuit board 114.

In an embodiment, the holder 100 may include at least one button 116 disposed on a rear surface of the body 110. For example, the at least one button 116 may include a touch sensor or a physical button. In an embodiment, the holder 100 may adjust the interval between the grips in response to a user's input to the at least one button 116. For example, when the external device is seated on the holder 100, the holder 100 may increase the interval between the grips by a predetermined distance in response to a user's input to the button 116. As the grip interval increases, the external device may be easily removed from the holder 100. The at least one button 116 can be disposed at additional or alternative locations including, but not limited to, sides of the holder 100.

Figure 6:
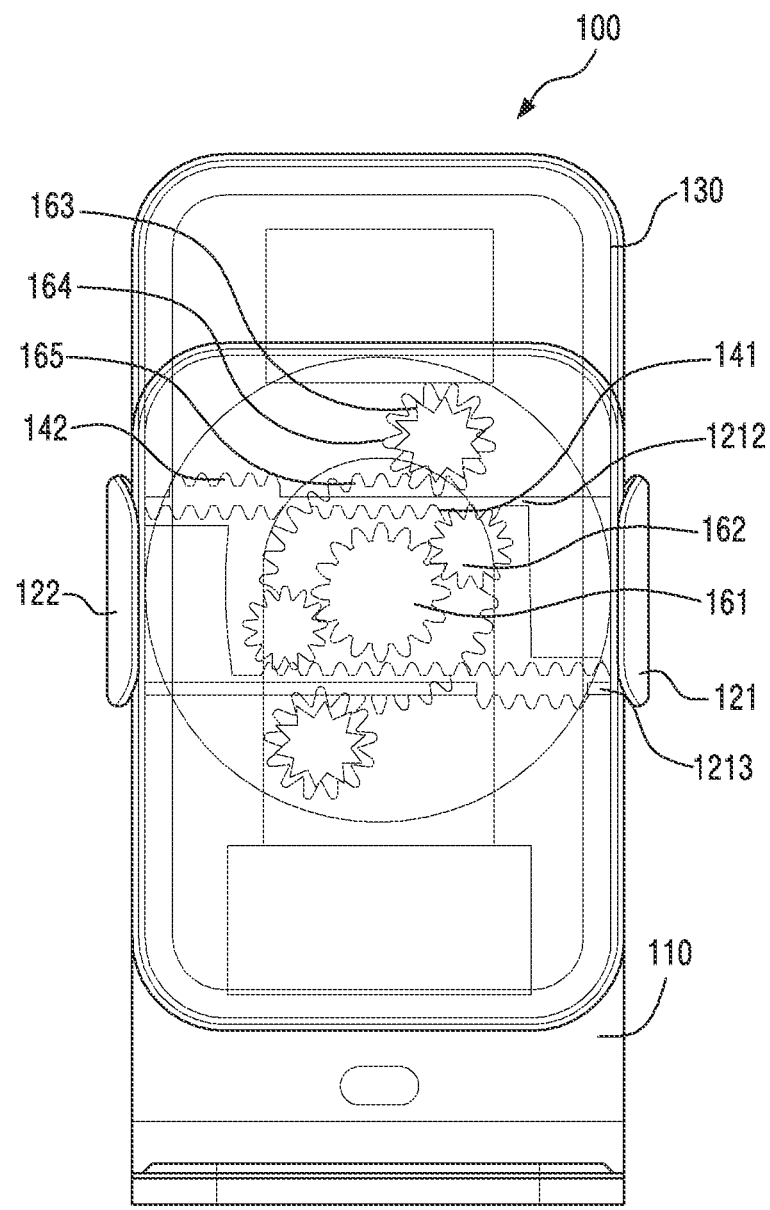
FIG. 6 illustrates a mechanism for adjusting a grip interval and a mechanism for rotating a cradle in an embodiment.
Figure 7:
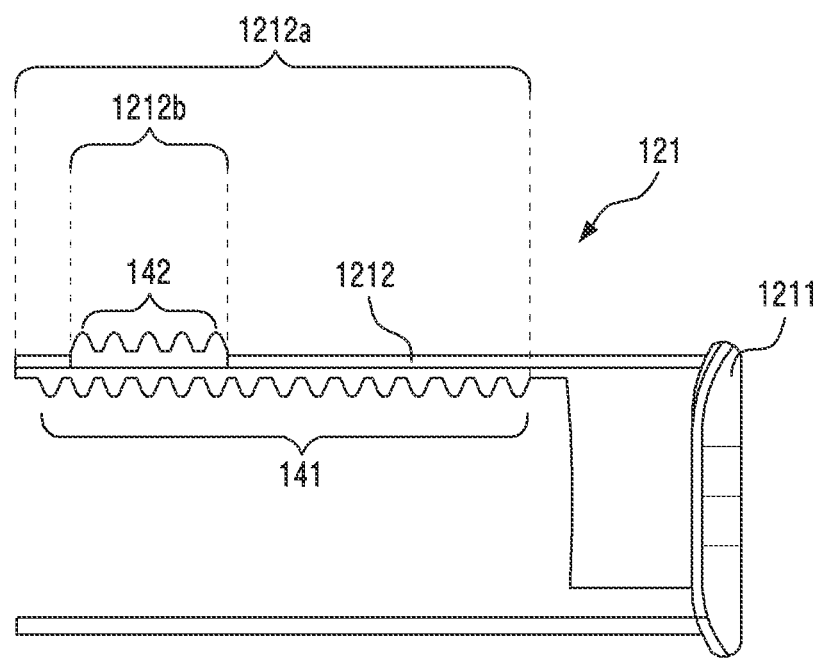
FIG. 7 illustrates in detail a construction of an arm of a holder in an embodiment.

FIG. 6 illustrates a mechanism for adjusting a grip interval and a mechanism for rotating the cradle 130 in an embodiment. FIG. 7 illustrates in detail a construction of an arm of the holder 100 in an embodiment.

In an embodiment, the holder 100 may include a first mechanism for adjusting the grip interval, and a second mechanism for rotating the cradle 130 according to the grip interval.

In an embodiment, the holder 100 may include a driving unit for operating the first mechanism and the second mechanism. For example, the driving unit may include a motor (e.g., the motor 113 of FIG. 3) mechanically connected to the first mechanism and the second mechanism. In an embodiment, the holder 100 may include a single driving unit for operating both the first mechanism and the second mechanism. In another embodiment, the holder 100 may include independent driving units for operating the first mechanism and the second mechanism. For example, the first mechanism may be operated by a first driving unit and the second mechanism may be operated by a second driving unit.

In an embodiment, the driving unit may be controlled by a processor of the holder 100 to adjust the grip interval or to adjust the rotation of the cradle 130. For example, the holder 100 may control the driving unit to increase or decrease the grip interval. For another example, the holder may control the driving unit to rotate the cradle 130 relative to the body 110.

The first mechanism may convert a rotational movement of the motor into a horizontal movement of the first arm 121 and the second arm 122. In an embodiment, the first arm 121 and the second arm 122 may slide relative to the body 110 by the first mechanism. In an embodiment, the first arm 121 and the second arm 122 may move in opposite directions. When the first arm 121 and the second arm 122 move in opposite directions to each other, an interval between the first grip part 1211 and the second grip part 1221 that extend from the ends of the first arm 121 and the second arm 122 may increase or decrease.

The second mechanism may rotate the cradle 130 relative to the body 110 according to a change of the grip interval. In the embodiment shown in FIG. 6, the cradle 130 is vertically disposed on the body 110, and when the grip is widened, the cradle 130 may rotate by the second mechanism and, as shown in FIG. 2, be horizontally disposed on the body 110.

Referring to FIG. 7, in an embodiment, the arm may include rack gears 141 and 142. For example, the first arm may include a slide part 1212 that extends in a horizontal direction from the grip part 1211, and the rack gears 141 and 142 may be disposed in a longitudinal direction of the slide part 1212.

In an embodiment, the first arm 121 may include the first rack gear 141 that is disposed in the longitudinal direction of the slide part 1212 on a part of the slide part 1212. In an embodiment, the first rack gear 141 may be disposed on a first portion 1212a of the first slide part 1212. In an embodiment, the first arm 121 may include the second rack gear 142 that is disposed in the longitudinal direction of the slide part 1212 on a part of the slide part 1212. In an embodiment, a second portion 1212b of the first slide part 1212 on which the second rack gear 142 is disposed may be included in the first portion 1212a. According to the illustrated embodiment, the first rack gear 141 may be disposed on one side of the first slide part 1212, and the second rack gear 142 may be disposed on the other side of the first slide part 1212.

In an embodiment, the second arm 122 may include a slide part and rack gears disposed on the slide part like the first arm 121. For example, referring to FIG. 6, the second arm 122 may have a shape symmetrical to the first arm 121.

Referring to FIG. 6, in an embodiment, the first mechanism may include a first gear 161, a second gear 162 engaged with the first gear 161, and a first rack gear engaged with the second gear 162. In an embodiment, the first gear 161 may be rotatably installed inside the body 110. In an embodiment, the second gear 162 engaged with the first gear 161 may be rotatably installed inside the body 110. The first rack gear 141 engaged with the second gear 162 may be formed integrally with the first arm 121. The rotational movement of the first gear 161 may be converted into a horizontal movement of the first arm 121 by the engagement between the first gear 161, the second gear 162, and the first rack gear 141.

In the illustrated embodiment, when the first gear 161 rotates clockwise, the second gear 162 may rotate counter-clockwise and the first arm 121 may move to the left. When the first gear 161 rotates counterclockwise, the second gear 162 may rotate clockwise and the first arm 121 may move to the right. In an embodiment, the second arm 122 may move relative to the body 110 according to the rotation of the first gear 161, but may move in an opposite direction to the first arm 121. In an embodiment different from the embodiment shown in FIG. 3 to FIG. 6, the second gear 162 may be omitted, and the first gear 161 and the first rack gear 141 may be directly engaged with each other.

The grip interval may be determined according to a rotation direction and rotation amount of the motor 113. For example, the grip interval may increase when the motor 113 rotates in a first direction, and the grip interval may decrease when the motor 113 rotates in a second direction opposite to the first direction. For example, the grip interval may increase by a first interval when the motor 113 rotates by a first angle, and the grip interval may increase by a second interval when the motor 113 rotates by a second angle.

In an embodiment, the second mechanism may include a third gear 163 that may be engaged with the second rack gear 142 of the first arm 121, a fourth gear 164 that rotates integrally with the third gear 163, and a fifth gear 165 that is engaged with the fourth gear 164 and rotates integrally with the cradle 130. In an embodiment, the third gear 163 and the fourth gear 164 may be one component. For example, the holder 100 may include a gear shaft that is rotatably installed on the body 110, and the third gear 163 and the fourth gear 164 may be disposed on first and second outer circumferential surfaces of the gear shaft, respectively.

In an embodiment, the cradle 130 may be rotated according to the movement of the first arm 121. In an embodiment, the cradle 130 may selectively rotate according to which position the first arm 121 is positioned in relative to the body 110. For example, when the second rack gear 142 of the first arm 121 passes a region corresponding to the third gear 163, the cradle may rotate by the engagement of the fourth gear 164 and the fifth gear 165.

Figure 8:
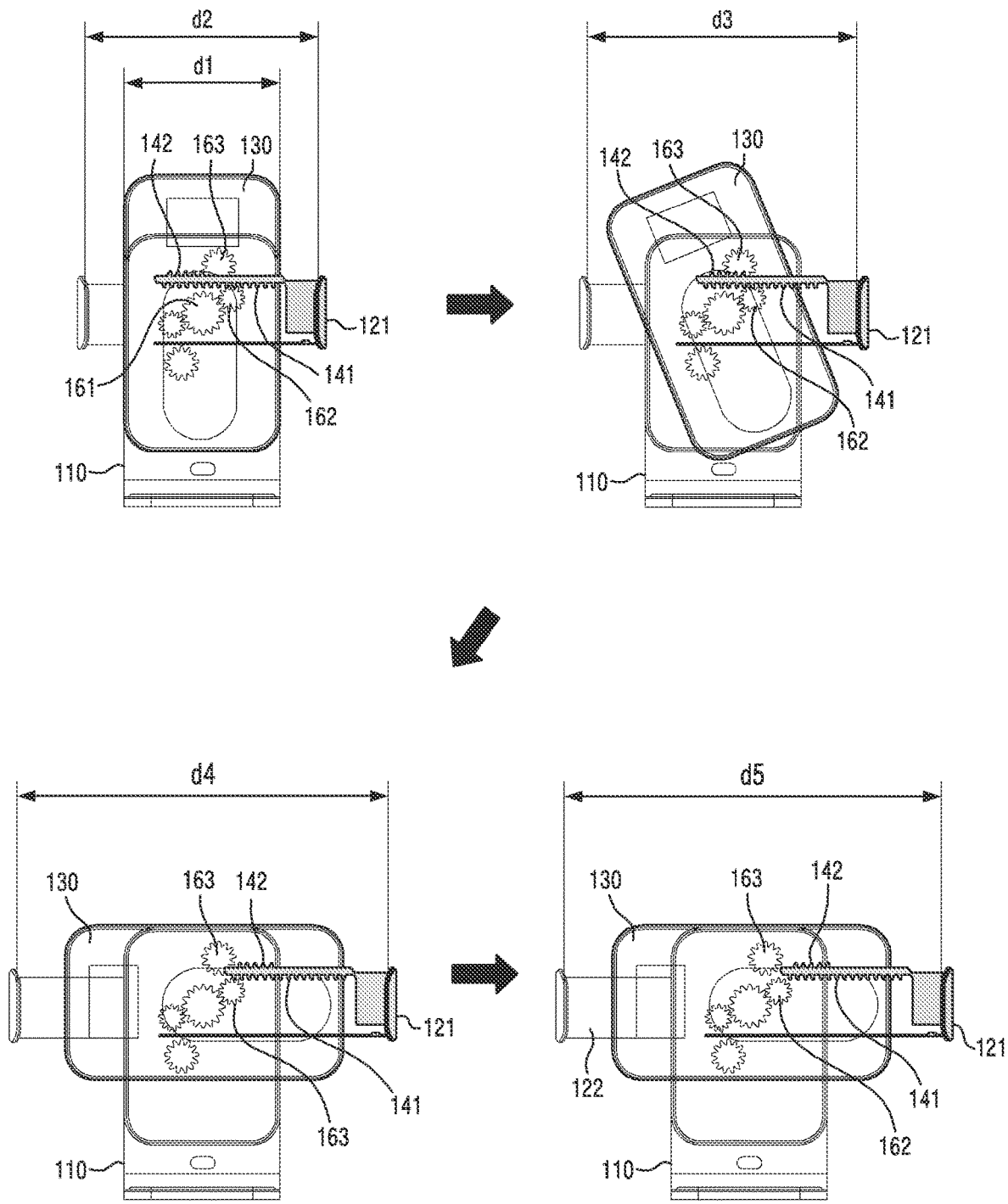
FIG. 8 illustrates an operation in which a cradle rotates when a grip interval is widened.

FIG. 8 illustrates an operation in which the cradle 130 rotates when a grip interval is widened.

In an embodiment, the cradle 130 may be stationary relative to the body 110 in a first range in which the grip interval is extended from a first interval (d1) to a second interval (d2). This is because in a first section, the second gear 162 and the first rack gear 141 are engaged with each other according to the rotation of the first gear 161, but the second rack gear 142 and the third gear 163 are not engaged with each other. According to the illustrated embodiment, when the grip interval is in the first section, the cradle 130 may be vertically disposed relative to the body 110.

In an embodiment, the cradle 130 may rotate relative to the body 110 in a second section in which the grip interval is extended from the second interval (d2) to a fourth interval (d4). This is because in the second section, the second rack gear 142 and the third gear 163 are engaged with each other according to the rotation of the first gear 161. According to the illustrated embodiment, at an ending time point of the second section, the cradle 130 may be horizontally disposed on the body 110. At some time points among the second section, the grip interval may be a third interval (d3), and in this case, the cradle 130 may have an intermediate state between a horizontal mode and a vertical mode relative to the body 110. For example, the cradle 130 may be disposed to be inclined in one direction relative to the body 110.

In an embodiment, the cradle 130 may be stationary relative to the body 110 in a third section in which the grip interval is extended from the fourth interval (d4) to a fifth interval (d5). This is because in the third section, the second gear 162 and the first rack gear 141 are engaged with each other according to the rotation of the first gear 161, but the second rack gear 142 and the third gear 163 are not engaged with each other.

Figure 10:
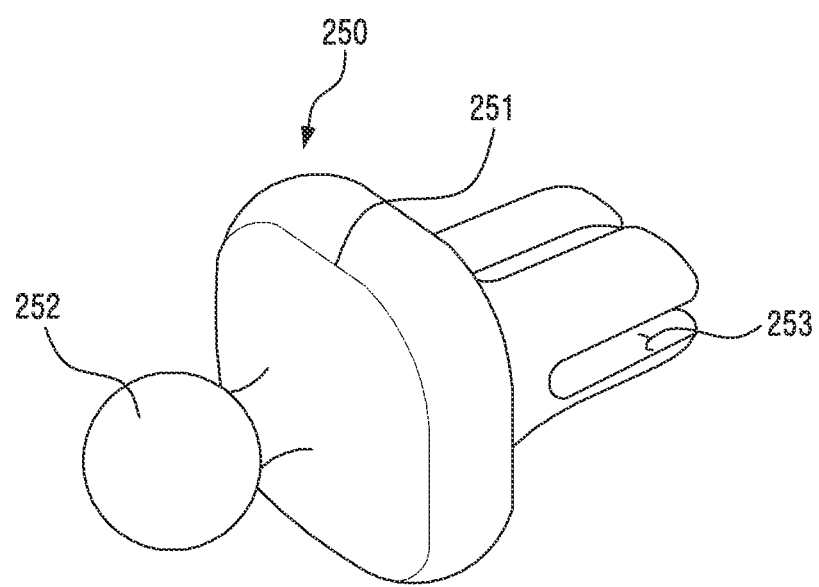
FIG. 10 illustrates a vehicle mount for installing the holder of FIG. 1 in a vehicle in an embodiment.

FIG. 9 illustrates the stand 150 that may support the holder 100 of FIG. 1 in an embodiment. FIG. 10 illustrates a vehicle mount that may install the holder 100 of FIG. 1 in a vehicle in an embodiment.

In an embodiment, the stand 150 and the mount 250 may include bodies 151 and 251, and ball parts 152 and 252 extending from respective parts of the bodies 151 and 251. The ball parts 152 and 252 may be inserted into the socket included in the body 110 of the holder 100.

In an embodiment, the mount 250 may include protruding parts 253 that may be coupled to a grill of an air outlet of the vehicle. In an embodiment, the mount 250 may include several protruding parts 253 that extend from the body 251 in an opposite direction to the ball part 252. The several protruding parts 253 may be spaced apart from each other, and thus the mount 250 may present a space in which other structures may be positioned between the protruding parts 253. For example, the grill of the vehicle may be positioned in the space between the protruding parts 253. That is, a user may install the holder 100 in the vehicle by fitting the mount 250 into the air outlet wherein the air outlet grill of the vehicle is positioned between the protruding parts 253 of the mount 250.

Figure 11:
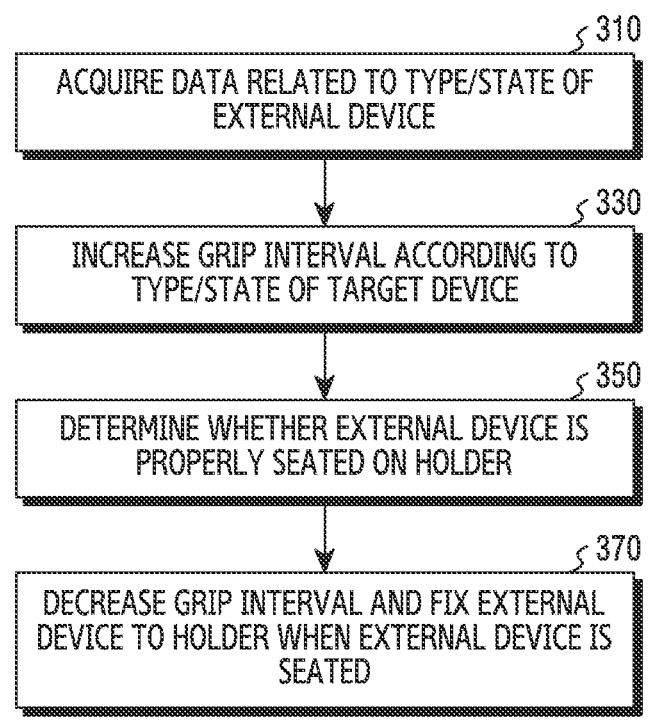
FIG. 11 is a flowchart of adjusting a grip interval of a holder according to a type or state of an external device in an embodiment.

FIG. 11 illustrates a flowchart of adjusting a grip interval of the holder 100 according to a type or state of an external device according to an embodiment. A process of FIG. 11 may be performed by the holder 100 (or the processor of the holder 100) of FIG. 1 to FIG. 8.

In an embodiment, in operation 310, the holder 100 may acquire information related to the state or type of the external device. In an embodiment, the holder may acquire information indicating the state of the external device by using at least one sensor (e.g., an optical sensor, a proximity sensor, or an ultrasonic sensor). In an embodiment, the holder may sense a size or width of the external electronic device by using the at least one sensor.

In an embodiment, in operation 310, the holder 100 may receive information on the external device from the external device through a wireless communication circuit. For example, the holder 100 may transmit identification information for identifying the holder 100 to the external device, wherein the external device may execute an application corresponding to the identification information. When the application corresponding to the identification information is not installed, the external device may download an installation file of the application from an external server and install the application. The external device may transmit information on the external device to the holder 100 by using the executed application. The information on the external device may include, for example, information on the type or state of the external device. For example, the holder 100 may receive information on a size of the external device. For another example, the holder 100 may receive information indicating whether the external device is a foldable device from the external device. The holder 100 may receive information indicating whether the external device is in an unfolded state or a folded state. According to another embodiment, in operation 310, the holder 100 may receive identification information on the external device by using the wireless charging coil 132 as well.

In an embodiment, when the external device is located close to the holder 100, the holder 100 may receive data or signal regarding the type or state of the external device from the external device through short-range wireless communication. In another embodiment, the holder 100 may receive data about the type or state of the external device from the external device through wireless communication (e.g., Bluetooth™ communication, NFC).

In an embodiment, the holder 100 may receive data from the external device in response to detecting the external device by using a sensor. For example, the holder 100 may determine that the external device is located close to the holder 100 (or is held on the holder 100) through at least one sensor 112 (e.g., a proximity sensor), and in response to this, may connect wireless communication with the external device, and may receive data from the external device.

In an embodiment, in operation 330, the holder 100 may adjust the grip interval to correspond to the size of the external device. In an embodiment, the holder 100 may adjust the grip interval by using data related to the size of the external device acquired through at least one sensor or wireless communication.

In an embodiment, the holder 100 may adjust the grip interval to a width that is equal to or is greater than a width of the external device by a predetermined distance based on the width of the external device measured using at least one sensor.

In an embodiment, the holder 100 may adjust the grip interval based on the data received from the external device. In an embodiment, the holder 100 may adjust the grip interval to correspond to the type or state of the external device. In an embodiment, the holder 100 may adjust the grip interval to correspond to the width of the external device. In an embodiment, the holder 100 may increase the grip interval by a predetermined length greater than the width of the external device. When the grip interval is wider than the width of the external device, a user may relatively easily hold the external device on the holder 100. For example, a processor of the holder 100 may determine a control value corresponding to the type or state of the external device, and may drive the motor 113 to rotate the first gear 161 by a rotation angle corresponding to the size of the determined control value.

In an embodiment, when the external device is a foldable device in a folded state, the holder 100 may adjust the grip interval to correspond to a state of the foldable device. For example, when the external device is the foldable device in an unfolded state, the holder 100 may control the motor wherein the grip interval corresponds to a width of the foldable device of the unfolded state. For another example, when the external device is the foldable device in the folded state, the holder 100 may control the motor wherein the grip interval corresponds to a width of the foldable device in the folded state.

In an embodiment, in operation 350, the holder 100 may determine whether the external device is properly seated on the holder 100. In an embodiment, the holder 100 may determine whether the external device is properly aligned with the holder 100. In an embodiment, when the wireless charging coil 132 of the external device is not aligned with the wireless charging coil 132 of the holder 100, the holder 100 may determine that the external device is not properly seated on the holder 100. For example, the holder 100 may determine how much wireless charging efficiency is through wireless communication with the external device, and when the wireless charging efficiency is lower than a reference value, the holder 100 may determine that the external device is not properly aligned with the holder 100.

In an embodiment, the holder 100 may present a notification indicating whether a position of the external device relative to the holder 100 is appropriate or whether wireless charging is in a normal state according to a determination that the external device is not properly aligned with the holder 100. For example, the holder 100 may present a notification to the user by using a speaker or LED light. For another example, the holder 100 may send a signal related to a state of wireless charging to the external device and present a notification to the user through the external device.

In an embodiment, in operation 370, the holder 100 may fix the external device to the holder 100. When it is determined that the external device is properly seated on the holder 100, the holder 100 may adjust the grip interval and firmly fix the external device to the holder 100. When the external device is seated on the holder 100, the grip interval may increase wider than the width of the external device for a convenience of holding, and in operation 370, the grip parts 1211 and 1221 may catch both sides of the external device while the grip interval decreases. Accordingly, when the holder 100 is shaken, the external device may not be easily removed from the holder 100. Here, the arms 121 and 122 are controlled wherein the cradle 130 is operated to rotate or not rotate according to the narrowed grip interval, whereby the wireless charging coil 132 may be disposed in a position corresponding to a position of the charging coil of the external device.

Figure 12:
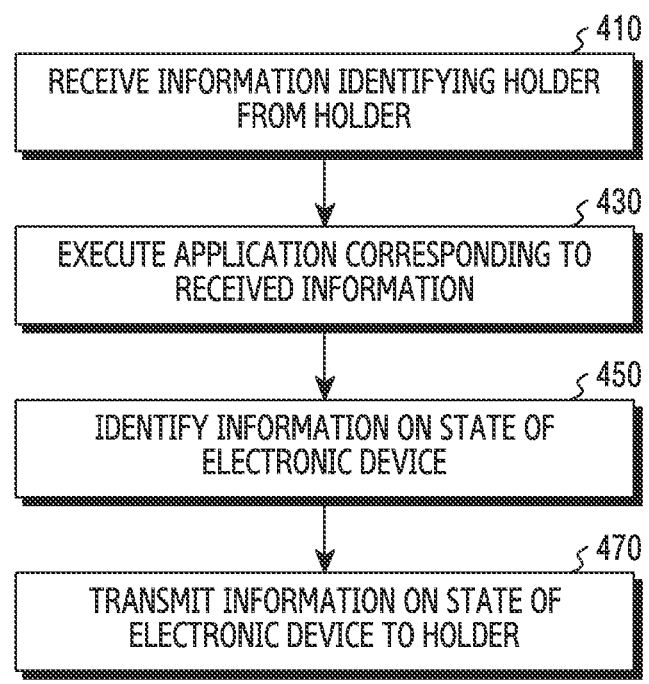
FIG. 12 is a flowchart illustrating operations performed when a foldable device that may be held on a holder identifies the holder in an embodiment.

FIG. 12 is a flowchart illustrating operations performed when a foldable device that may be held on a holder identifies the holder in an embodiment.

In an embodiment, in operation 410, an electronic device may receive information identifying the holder, from the holder. For example, the electronic device may receive data including a unique identifier of the holder from the holder through a wireless communication circuit.

In operation 430, the electronic device may execute an application corresponding to the received information. In an embodiment, the electronic device may execute an application related to the holder in response to the identifying of the holder. An application related to the holder may be configured to support data communication between the electronic device and the holder. For example, the electronic device may transmit data related to a state of the electronic device to the holder through the application.

In an embodiment, when the holder is identified, the electronic device may determine whether the application related to the holder is installed in the electronic device. When the application is not installed, the electronic device may automatically install the application or present a screen of inducing the user to install the application related to the holder. In an embodiment, the application related to the holder may be installed when the electronic device is first held on the holder.

In operation 450, the electronic device may identify information on a state of the electronic device. In an embodiment, when the electronic device includes a foldable housing, the electronic device may identify information indicating whether the housing is in an unfolded state or a folded state. For example, the electronic device may determine a state of the housing by using an internal sensor. In another embodiment, the electronic device may identify information indicating how long a width of the housing is.

In operation 470, the electronic device may transmit information on the state of the electronic device, to the holder. In an embodiment, when the electronic device includes the foldable housing, the electronic device may transmit information indicating whether the housing is in an unfolded state or a folded state to the holder. In another embodiment, the electronic device may transmit information indicating how long the width of the housing is to the holder.

In an embodiment, a holder may include a body, a cradle rotatably coupled to the body and including a seating surface on which an external electronic device is seatable, a first driving unit configured to rotate the cradle, a wireless communication circuit, and at least one processor. The at least one processor may be configured to receive data about a state of the external electronic device from the external electronic device through the wireless communication circuit, and to control the first driving unit to pivot the cradle by a predetermined angle based on the state of the external electronic device.

In an embodiment, the wireless communication circuit may be configured to support Bluetooth™ or short-range wireless communication.

In an embodiment, the holder may further include a wireless charging circuit connected to the at least one processor, and a first wireless charging coil electrically connected to the wireless charging circuit and disposed inside the cradle. When the cradle is pivoted based on the state of the external electronic device, the first wireless charging coil may be aligned with a second wireless charging coil of the external electronic device.

In an embodiment, the at least one processor may be further configured to determine whether the first wireless charging coil is aligned with the second wireless charging coil through the wireless communication circuit, and present a notification indicating that the external electronic device is not properly held on the holder based on the determination that the first wireless charging coil is not aligned with the second wireless charging coil.

In an embodiment, the holder may further include a pair of arms assembled to the body and movable in opposite directions relative to the body via a first mechanism, each of the pair of arms including a grip configured to hold the external electronic device, and a second driving unit configured to move the pair of arms.

In an embodiment, when the external electronic device includes a foldable housing that may be folded or unfolded, the at least one processor may be further configured to control the second driving unit to adjust an interval between the grips to a first distance based on the determination that the external electronic device is in a folded state, and control the second driving unit to adjust the interval between the grips to a second distance wider than the first distance based on the determination that the external electronic device is in an unfolded state.

In an embodiment, a holder may include a body, a cradle rotatably coupled to the body and including a seating surface on which an external electronic device may be seated, and a pair of arms assembled to the body and movable in opposite directions relative to the body through a first mechanism, each of the pair of arms including a grip configured to hold the external electronic device, and an interval between the grips being variable within a predetermined range according to the movement of the arms. The cradle may be configured to maintain a stationary state relative to the body when the interval between the grips is in a first range among the predetermined range, and rotate relative to the body through a second mechanism when the interval between the grips is in a second range among the predetermined range.

In an embodiment, the first mechanism may include a first gear rotatably installed in the body, and a first rack gear disposed on a first portion of the arm and engaged with the first gear directly or through at least one gear. The arm may move relative to the body according to the rotation of the first gear, and the interval between the grips may be varied.

In an embodiment, the at least one gear of the first mechanism may include a third gear rotatably installed in the body and engaged with the first gear and the first rack gear.

In an embodiment, the second mechanism may include a second rack gear disposed on a second portion of the arm, a third gear rotatably installed in the body and engaged with the second rack gear, a fourth gear rotatably installed in the body and rotated integrally with the third gear, and a fifth gear fixedly coupled to the cradle and engaged with the fourth gear. When the grip interval passes the second range according to the movement of the arm, the second rack gear may be engaged with the third gear, and while the second rack gear is engaged with the third gear, the cradle may rotate relative to the body.

In an embodiment, the third gear and the fourth gear may be formed integrally on one shaft, and the third gear may be formed on a first outer circumferential surface of the shaft, and the fourth gear may be formed on a second outer circumferential surface of the shaft.

In an embodiment, the second mechanism may be configured wherein the cradle rotates relative to the body by 90 degrees while the grip interval passes the second range while increasing.

In an embodiment, the holder may further include a stand or mount including a ball part, and the body may include a socket for accommodating a part of the ball part.

In an embodiment, the holder may include a driving unit configured to operate the first mechanism and/or the second mechanism, a wireless communication circuit, and at least one processor electrically connected to the driving unit and the wireless communication circuit. The at least one processor may be configured to receive data about a state of the foldable device from the foldable device through the wireless communication circuit, and control the driving unit to adjust the grip interval based on the data.

In an embodiment, the at least one processor may be further configured to control the driving unit to adjust the grip interval to a first distance based on a determination that the foldable device is in a folded state, and control the driving unit to adjust the grip interval to a second distance wider than the first distance based on a determination that the foldable device is in an unfolded state.

In an embodiment, the wireless communication circuit may include one of Bluetooth™ communication and short-range wireless communication.

In an embodiment, the holder may further include a wireless charging circuit connected to the at least one processor, and a first wireless charging coil electrically connected to the wireless charging circuit, and disposed inside the cradle. When the cradle is pivoted based on a state of the foldable device, the first wireless charging coil may be aligned with a second wireless charging coil of the foldable device.

In an embodiment, the at least one processor may be further configured to determine whether the first wireless charging coil is aligned with the second wireless charging coil through the wireless communication circuit, and when the first wireless charging coil is not aligned with the second wireless charging coil, present a notification of indicating that the foldable device is not properly held on the holder.

In an embodiment, the first wireless charging coil may have a round rectangular shape, a stadium shape, or a slot shape.

In an embodiment, the holder may further include a proximity sensor connected to the at least one processor, and the at least one processor may be further configured to, when detecting a foldable device by using the proximity sensor, control the driving unit to widen the grip interval wherein the foldable device may be located between the grips.

The electronic device of various embodiments of the present disclosure may be various types of devices. The electronic device may include, for example, a portable communication device (e.g., a smart phone), a computer device, a portable multimedia device, a portable medical device, a camera, a wearable device, or a home appliance device. The electronic device of the embodiment of the present disclosure is not limited to the above-described devices.

Various embodiments of the present disclosure and terms used therein are not intended to limit the technical features mentioned in the present disclosure to specific embodiments, and should be understood to include various modifications, equivalents, or alternatives of the embodiments. In connection with a description of the drawings, like reference numerals may be used for similar or related components. The singular form of the noun corresponding to the item may include one or more of the item, unless the relevant context clearly dictates otherwise. In the present disclosure, each of phrases such as "A or B", "at least one of A and B", "at least one of A or B," "A, B or C," "at least one of A, B and C," and "at least one of A, B, or C" may include any one of the items listed together in the corresponding one of the phrases, or all possible combinations thereof. Terms such as "a first", "a second", or "the first" or "the second" may simply be used to distinguish a corresponding component from other corresponding components, and do not limit corresponding components in other aspects (e.g., importance or order). When one (e.g., a first) component is mentioned as "coupled" or "connected" to another (e.g., a second) component with or without the terms "functionally" or "communicatively", it means that one component may be connected to the other component directly (e.g., by wire), wirelessly, or through a third component.

What is claimed is:

1. An electronic device comprising:

a body;

a cradle rotatably coupled to the body and comprising a seating surface on which an external electronic device is seatable;

a first driving unit configured to rotate the cradle;

a wireless communication circuit;

a first wireless charging coil disposed in the cradle; and at least one processor, wherein the at least one processor is configured to:

receive data about a state of the external electronic device from the external electronic device through the wireless communication circuit; and control the first driving unit to pivot the cradle by a predetermined angle based on the state of the external electronic device to bring the first wireless charging coil into alignment with a second wireless charging coil of the external electronic device.

2. The electronic device of claim 1, wherein the wireless communication circuit is configured to support Bluetooth™ or short-range wireless communication.

3. The electronic device of claim 1, further comprising a wireless charging circuit connected to the at least one processor, wherein the first wireless charging coil is electrically connected to the wireless charging circuit.

4. The electronic device of claim 3, wherein the at least one processor is further configured to:

determine whether the first wireless charging coil is aligned with the second wireless charging coil through the wireless communication circuit; and present a notification indicating that the external electronic device is not properly held on the electronic device based on the determining indicating that the first wireless charging coil is not aligned with the second wireless charging coil.

5. The electronic device of claim 1, further comprising:

arms assembled to the body and movable in opposite directions relative to the body through a first mechanism, each of the arms comprising a grip configured to hold the external electronic device; and a second driving unit configured to move the arms.

6. The electronic device of claim 5, wherein:

the external electronic device comprises a foldable housing, and the at least one processor is further configured to:

control the second driving unit to adjust an interval between the grips to a first distance based on the foldable housing of the external electronic device being in a folded state; and control the second driving unit to adjust the interval between the grips to a second distance wider than the first distance based on that the foldable housing of the external electronic device being in an unfolded state.

7. An electronic device comprising:

a body;

a cradle rotatably coupled to the body and comprising a seating surface on which an external electronic device is seatable; and arms assembled to the body and movable in opposite directions through a first mechanism, each of the arms comprising a grip configured to hold the external electronic device, and an interval between the grips being variable within a predetermined range according to a movement of the arms, wherein the cradle is configured to:

maintain a stationary state relative to the body when the interval between the grips is in a first range among the predetermined range; and rotate relative to the body through a second mechanism when the interval between the grips is in a second range among the predetermined range.

8. The electronic device of claim 7, wherein the first mechanism comprises:

a first gear rotatably installed in the body; and a first rack gear disposed on a first portion of a corresponding one of the arms and engaged with the first gear directly or through at least one gear, wherein:

the corresponding one of the arms moves relative to the body according to the rotation of the first gear, and the interval between the grips is varied.

9. The electronic device of claim 8, wherein the at least one gear of the first mechanism comprises a third gear rotatably installed in the body and engaged with the first gear and the first rack gear.

10. The electronic device of claim 7, wherein the second mechanism comprises:

a second rack gear disposed on a second portion of a corresponding one of the arms;

a third gear rotatably installed in the body and engaged with the second rack gear;

a fourth gear rotatably installed in the body and rotated integrally with the third gear; and a fifth gear fixedly coupled to the cradle and engaged with the fourth gear, wherein:

when the interval between the grips passes the second range according to the movement of the corresponding one of the arms, the second rack gear is engaged with the third gear, and while the second rack gear is engaged with the third gear, the cradle rotates relative to the body.

11. The electronic device of claim 7, wherein the second mechanism is configured such that the cradle rotates relative to the body by 90 degrees while the interval between the grips passes the second range while increasing.

12. The electronic device of claim 7, further comprising a stand or mount comprising a ball part,
wherein the body comprises a socket for accommodating a part of the ball part.

13. The electronic device of claim 7, comprising:
a driving unit configured to operate at least one of the first mechanism and the second mechanism;
a wireless communication circuit; and
at least one processor electrically connected to the driving unit and the wireless communication circuit,
wherein the at least one processor is configured to:
receive data about a state of the external electronic device from the external electronic device through the wireless communication circuit; and
control the driving unit to adjust the interval between the grips based on the data.

14. The electronic device of claim 13, wherein:
the external electronic device comprises a foldable housing, and
the at least one processor is further configured to:
control the driving unit to adjust the interval between the grips to a first distance based on the foldable housing of the external electronic device being in a folded state; and
control the driving unit to adjust the interval between the grips to a second distance wider than the first distance based on the foldable housing of the external electronic device being in an unfolded state.

15. The electronic device of claim 13, wherein the wireless communication circuit comprises one of Bluetooth™ communication and short-range wireless communication.

16. An electronic device for an electronic device, the electronic device comprising:
a body;
a cradle rotatably coupled to the body and comprising a seating surface to seat the electronic device;
a first driving unit configured to rotate the cradle; and
a processor which is receptive of data about a folded or unfolded state of the electronic device and which is configured to control the first driving unit to pivot the cradle by a predetermined angle based on the folded or unfolded state of the electronic device.

17. The electronic device of claim 16, further comprising:
a wireless charging circuit connected to the processor;
a first wireless charging coil electrically connected to the wireless charging circuit and disposed inside the cradle; and
a second wireless charging coil,
wherein, when the cradle is pivoted based on the folded or unfolded state of the electronic device, the first wireless charging coil is aligned with the second wireless charging coil.

18. The electronic device of claim 17, wherein the processor is further configured to:
determine whether the first wireless charging coil is aligned with the second wireless charging coil; and
present a notification indicating that the electronic device is not properly held on the electronic device based on the determining indicating that the first wireless charging coil is not aligned with the second wireless charging coil.

19. The electronic device of claim 18, further comprising:
arms assembled to the body and movable in opposite directions relative to the body through a first mechanism, each of the arms comprising a grip configured to hold the electronic device; and
a second driving unit configured to move the arms.

20. The electronic device of claim 19, wherein:
the electronic device comprises a foldable housing, and
the at least one processor is further configured to:
control the second driving unit to adjust an interval between the grips to a first distance based on the foldable housing being folded; and
control the second driving unit to adjust the interval between the grips to a second distance wider than the first distance based on the foldable housing being unfolded.

* * * * *